B. HARRIS.
TIRE.
APPLICATION FILED AUG. 22, 1917.

1,278,078.

Patented Sept. 3, 1918.

WITNESSES

W. C. Fielding
J. P. Campbell

INVENTOR
Benjamin Harris

BY Richard Owen.

ATTORNEY

UNITED STATES PATENT OFFICE.

BENJAMIN HARRIS, OF EAST AKRON, OHIO.

TIRE.

1,278,078.　　　　Specification of Letters Patent.　　Patented Sept. 3, 1918.

Application filed August 22, 1917.　Serial No. 187,653.

*To all whom it may concern:*

Be it known that I, BENJAMIN HARRIS, a citizen of the United States, residing at East Akron, in the county of Summit and State of Ohio, have invented certain new and useful Improvements in Tires, of which the following is a specification.

My invention relates to new and useful improvements in a tire and has for its principal object the construction of a tire in such a manner that it does not have to be inflated but at the same time has the resiliency of a pneumatic tire.

A further object is the construction of a tire with an outer casing of ordinary construction and an inner resilient member extending circumferentially of the casing to normally hold the tire extended but allowing it to be compressed to take up jars.

With these and other objects in view the invention consists in the novel details of construction and arrangement of parts which will be more clearly understood from the following description and drawings, in which—

Figure 2:
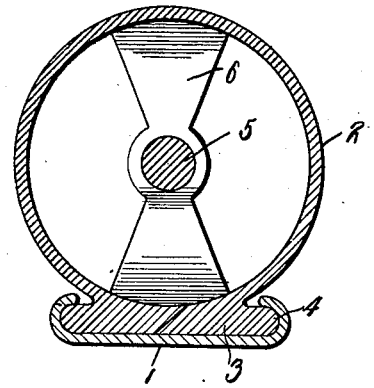
Fig. 2 is a transverse vertical section.

In the drawings the numeral 1 indicates the rim of a wheel which in this instance is shown as a channeled rim and 2 indicates the outer casing of a tire provided with the thickened edges 3 provided with flanges 4 adapted to be engaged by the rim 1 as illustrated, more particularly, in Fig. 2 of the drawings.

Figure 1:
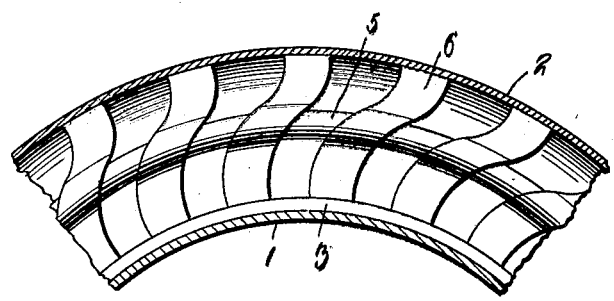
Figure 1 is a fragmental longitudinal section through the tire.

A core 5, preferably of pure rubber, is received centrally of the casing and extends circumferentially thereof and is adapted to receive the circumferentially spaced rubber blocks 6 which are preferably substantially ogee-shaped as, more particularly illustrated in Fig. 1 of the drawings. These rubber blocks 6, in end view, are of the shape illustrated in Fig. 2 of the drawings and are provided with a central opening through which the core 5 passes. These blocks 6 may be of any desired thickness whereby to secure the desired resiliency and as is illustrated in the drawings the ends of the blocks 6 engage opposite sides of the interior of the casing whereby the casing is normally held extended.

In constructing my tire as above described it will be seen that I may use a casing of ordinary construction, as now commonly used with pneumatic tires, and the core 5 carrying the blocks 6 is inserted in the casing as illustrated, whereby when the blocks are compressed they will be placed under tension. In this manner the initial jar, by compression, will be taken up but as the tire is further compressed the resistance will be increased and the blocks placed under greater tension. When the pressure is released the blocks will again expand and return the casing to its original position. By having the blocks spaced on the core they will readily give to compression and the core, itself being resilient, will also yield. It will be seen that the core with the blocks may be easily placed within the casing or removed when desired. By having the blocks 6 substantially ogee-shaped, so that the ends will engage the casing out of alinement, the blocks will more readily yield under initial tension than they would if they were perfectly straight.

While I have described my interior construction as forming a permanent part of the tire it will be understood that it might be carried in the automobile, so that in case of puncture to the ordinary pneumatic tire, the inner tube of said pneumatic tire might be removed and my core inserted.

Having fully described my invention what I claim as new and desire to secure by Letters Patent is:—

1. A tire comprising an outer casing, a resilient core extending circumferentially of the casing, and a plurality of ogee-shaped resilient blocks received on the core and engaging the casing.

2. A tire comprising an outer casing, a resilient core extending circumferentially of the casing, and a plurality of ogee-shaped resilient blocks received on the core and engaging the casing, said ogee-shaped blocks being flared transversely with respect to the core from the center to each end whereby they will be of greater width at the ends than at the center.

In testimony whereof I affix my signature in presence of two witnesses.

BENJAMIN HARRIS.

Witnesses:
　M. LUZIE,
　J. CLEVE FRY.